US008000008B2

(12) United States Patent
Sander

(10) Patent No.: US 8,000,008 B2
(45) Date of Patent: Aug. 16, 2011

(54) OPTICAL DEVICE WITH CONTROLLABLE DEFLECTION ELEMENT FOR VIBRATION COMPENSATION

(75) Inventor: Ulrich Sander, Rebstein (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 559 days.

(21) Appl. No.: 12/113,237

(22) Filed: May 1, 2008

(65) Prior Publication Data

US 2008/0278781 A1 Nov. 13, 2008

(30) Foreign Application Priority Data

May 10, 2007 (DE) .......................... 10 2007 021 981

(51) Int. Cl.
*G02B 27/64* (2006.01)
(52) U.S. Cl. ..................... 359/556; 250/201.3
(58) Field of Classification Search .................. None
See application file for complete search history.

(56) References Cited

U.S. PATENT DOCUMENTS

| 6,628,457 | B2 * | 9/2003 | Ito .................................. 359/368 |
| 6,658,208 | B2 * | 12/2003 | Watanabe et al. ............... 396/89 |
| 7,206,127 | B2 | 4/2007 | Sander |
| 2004/0160667 | A1 | 8/2004 | Sander |
| 2006/0171263 | A1 | 8/2006 | Cho et al. |
| 2007/0047070 | A1 * | 3/2007 | Sander .......................... 359/368 |

* cited by examiner

*Primary Examiner* — Arnel C Lavarias
(74) *Attorney, Agent, or Firm* — Hodgson Russ LLP

(57) ABSTRACT

An optical device, in particular a microscope (1), that includes a beam path in which is arranged at least one deflection element (5, 6a to 6f) for deflecting the beam path, at least one vibration sensor (34) being arranged in or on the optical device; at least one of the deflection elements (5, 6a to 6f) including a mirror having a controllably deformable mirror surface (50); and a control unit (32) being provided that, as a function of the output signal of the vibration sensor (34), applies control to the at least one deflection element (5, 6a to 6f) in order to adjust the mirror surface (50) in such a way that vibrations of the optical device are compensated for by a correspondingly opposite-phase adjustment of the mirror surface (50).

2 Claims, 3 Drawing Sheets

OPTICAL DEVICE WITH CONTROLLABLE DEFLECTION ELEMENT FOR VIBRATION COMPENSATION

CROSS REFERENCE TO RELATED APPLICATIONS

This application claims priority of German patent application 10 2007 021 981.6 filed May 10, 2007, which is incorporated by reference herein.

FIELD OF THE INVENTION

The present invention relates to an optical device, in particular a microscope, that comprises a beam path in which is arranged at least one deflection element for deflecting the beam path. The invention relates in particular to a microscope having a principal objective that defines an observation beam path along an optical axis, said observation beam path representing the aforesaid beam path of the optical device. These microscopes can be, in particular, stereomicroscopes and surgical microscopes.

BACKGROUND OF THE INVENTION

A generic optical device embodied as a stereomicroscope is known from DE 102 55 960 A1. The stereomicroscope has a principal objective and a zoom system arranged downstream said objective. Since the zoom system is arranged in a "lying" manner or "horizontally," i.e. the axis of the zoom system is substantially perpendicular to the optical axis defined by the principal objective, a deflection element is provided between the objective and zoom system to deflect the observation beam path into the corresponding magnification channels of the zoom system. The stereomicroscope further comprises additional optical components, such as filters, shutters, optical splitters, data overlay systems, etc., that are arranged in the observation beam path, said path being directed by further deflection elements into various horizontal planes of the microscope. This construction allows a low-profile microscope to be implemented. At the same time, the deflection elements can be configured as beam splitters, making possible outcoupling of the observation beam path and therefore multiple ports for multiple observers.

The present invention is not limited to the aforesaid construction according to DE 102 55 960 A1, but can be implemented in the context of any optical device in which a deflection element is present (or can be provided) for deflection of the beam path. The goal of the invention is to compensate for vibrations occurring in such an optical device, the term "vibrations" being intended generally to denote unintentional oscillations, motions, or other displacements out of the rest position. Such vibrations can be triggered by the user of the optical device him- or herself or by vibrations of the mounts supporting the optical device (e.g. the stand of a microscope), or can be transferred from walls, ceilings, or floors that are connected to the optical device (e.g. ceiling mounts or floor stands).

A damping system for a microscope is known from US 2001/0024 320 A1, in which a dynamic vibration absorber is provided which is mounted, for example, at the connecting point between the microscope and microscope stand. The dynamic vibration absorber can be a structure containing a piezoactuator. A vibration sensor senses vibrations of the stand arm to which the microscope is attached, whereupon a control system causes oscillations of the piezoelectric actuator in the Z direction (parallel to the optical axis) in such a way that the vibrations of the stand arm are very largely eliminated. The microscope tube and a CCD camera are arranged above the vibration absorber. Instead of a piezoelectric actuator, a passive damping element (silicone plastic or urethane plastic) can also be used. In further embodiments, vibration absorbers are provided at further locations in a microscope system made up of a microscope, stand, illumination unit, and imaging unit. The proposed arrangements are intended to prevent oscillations of the stand arm in the Z direction from being transferred to the microscope, so that the latter remains at rest. Unsharpness in the observed image due to vibration is thereby very largely eliminated.

DE 103 06 440 A1 describes an apparatus for suppressing vibrations in all three spatial directions for a microscope mounted on a stand. An actively reactive flexible structure (ARES) component is arranged, as a vibration compensation device, in, on, or instead of, a part of the microscope or stand. An ARES unit is a self-regulating component that, based on measurement of vibrations, applies control to integrated drive elements in such a way that they counteract the vibration in real time so that the vibration does not result in a change in position of the external contours. In this context, the ARES component can directly replace the support arm (stand arm), i.e. can serve simultaneously as a supporting and vibration-compensating element.

DE 43 42 538 A1 is likewise based on the object of decoupling a surgical microscope from forces acting on the stand that are transferred to the surgical microscope. For this purpose, it is proposed to mount at least one drive element for compensating for vibrations in or on the microscope, an electronic circuit being present that converts the signal of a sensor into the signal for the drive element. Linear motors are used as drive elements. It is advantageous in this context to arrange two linear motors in such a way that a slight movement of the microscope objective in one plane (X and Y directions) can occur. The principal objective is then moved in the X-Y plane in opposite-phase fashion to the external deflection, thereby improving image quality. The aforesaid document discloses various arrangements of such force-exerting devices for vibration decoupling of a surgical microscope, only vibrations in the aforesaid X-Y plane being compensated for. Similar devices for vibration decoupling of an optical device or microscope are described in U.S. Pat. No. 5,786,936 and in U.S. Pat. No. 5,731,896.

A feature common to the aforementioned existing art is that vibrations caused by the user's operations, or by other external vibrations transferred to the stand or microscope, are decoupled from the microscope by providing, at a suitable location on the microscope structure, a device that generates opposite-phase vibrations which eliminate the external vibrations. A disadvantage of this mechanical stabilization or decoupling of the microscope is the need for a separate component for vibration damping. The use of relatively large and heavy (linear) motors for adjustment and counter-control of the optical components requires very accurate control, and cannot achieve stabilization in the Z direction (parallel to the optical axis). When piezoelements are used in accordance with the aforesaid US 2001/0024320 A1, on the other hand, only vibrations in the Z direction are compensated for. The use of the aforesaid ARES components according to DE 103 06 440 A1, in contrast, has the advantage of vibration compensation in all three spatial directions. A further disadvantage of the known vibration compensation system is the system-inherent inertia of the vibration dampers that are used; this must be taken into account in the vibration compensation control system and results in a corresponding large outlay for control technology.

SUMMARY OF THE INVENTION

It is an object of the present invention to provide a vibration compensation system for an optical device, functioning as inertia-free as possible and preferably realizable without additional components.

This object is achieved, according to the present invention, by an optical device described herein. Advantageous embodiments are evident from the dependent claims and the description that follows.

According to the present invention, the optical device comprises at least one vibration sensor that is arranged in or on the optical device. Vibration sensors per se are known from the prior art and will therefore not be further explained here. They can be acceleration sensors that can sense any forms of vibration in all three spatial directions. Arrangement "in or on the optical device" means an arrangement within the optical device, i.e. for example in joints or in the interior of the optical device, the term "optical device" being intended to include all mounts, arms, stands, etc. that are connected to the actual optical device. As, however, the actual optical device, i.e. for example the microscope, is intended to be vibration-damped, it is advisable to arrange the at least one vibration sensor directly in or directly on the optical device, i.e. for example on the microscope itself. According to the present invention, at least one of the aforesaid deflection elements for deflecting the beam path in the optical device furthermore comprises a mirror having a controllably deformable mirror surface. Such mirrors are likewise known per se from the prior art and will therefore not be explained further hereinafter. Lastly, according to the present invention, a control unit is provided that, as a function of the output signal of the at least one vibration sensor, applies control to the at least one deflection element in order to adjust the mirror surface in such a way that vibrations of the optical device are compensated for by a correspondingly oppositely directed or opposite-phase adjustment of the mirror surface.

An occurring vibration can be considered an oscillation or displacement or rotation in at least one of the three spatial directions. It may thus be separated into X, Y, and Z components. Here, the X-Y plane can be equated with a horizontal plane (in the context of the microscope, for example, with a plane parallel to the object plane), and the Z direction can be identified with the direction perpendicular to the horizontal plane (in the case of the microscope, for example, with the optical axis perpendicular to the object plane).

For better comprehensibility, the invention will be further explained using the example of a microscope. One skilled in the art is able to translate this into other optical devices. When a microscope vibrates, the vibration in the X-Y plane results in a corresponding displacement, in the object plane, of the beam base point defined by the principal objective. This results, for the observer, in a corresponding wobble or jitter in the image. Vibrations in the Z direction, on the other hand, cause unsharpness in the image, since the focal length of the principal objective during observation is generally fixed and does not change as the vibration proceeds. According to the present invention, in order to compensate for the aforesaid vibrations, control is applied to the mirror surface of the at least one deflection element (already present or to be provided for this purpose) in such a way that the vibrations of the microscope are compensated for. Remaining with the example of a microscope, in the case of a displacement of the microscope in the X and/or Y direction caused by vibration, the mirror surface, which is expediently arranged behind the principal objective as viewed from the specimen, can displace the beam base point by the same amount in the opposite X and/or Y direction so that the user does not perceive any wobbling of the image. In the case of a displacement in the Z direction caused by vibration, the mirror surface can be deformed in, for example, a spherical fashion so that the focal length of the principal objective of the microscope is effectively modified, and the microscope image is focused onto a different object plane in accordance with the Z vibration. Thus, if the microscope moves downward (toward the specimen) because of the vibration, a corresponding mirror deformation must consequently shorten the effective focal length of the principal objective, whereas a vibration-related upward displacement of the microscope must result in an increase in the effective focal length of the principal objective.

Because the deformations of the mirror surfaces can be accomplished electronically, a virtually inertia-free vibration compensation in all three spatial directions in real time is therefore possible.

It is particularly advantageous if the deformable mirror surface provided on the at least one deflection element is embodied as a micromirror array that comprises an arrangement of individually controllable micromirrors whose spatial orientation is adjustable. Such micromirror arrays are known per se from the prior art and will therefore not be further explained hereinafter. The principal advantage of a micromirror array is that only the micromirrors, movably mounted on a base frame, need to be tilted in order to modify the deflection of a beam path, without moving the base frame itself. The individual micromirrors can be controlled electronically. The micromirrors are advantageously arranged on a two-dimensional matrix. Each micromirror may advantageously be tilted or pivoted about two mutually perpendicular tilt axes. In order to compensate for vibration-related displacements in the X and/or Y direction, the individual micromirrors can be correspondingly pivoted about the first and/or second tilt axis. To compensate for vibration-related Z displacements, the micromirrors are to be arranged as a whole, for example, spherically, in order (as already stated) to modify the effective focal length of the principal objective.

To compensate for vibration-related Z displacements, it is particularly advantageous to arrange the deformable mirror surface, such as the micromirrors of the micromirror arrays, in a spherical or an aspherical geometry. While a spherical geometry per se is sufficient to impart additional refractive power to the optical system, the aspherical geometry is furthermore suitable, in particular, for correcting optical aberrations (cf. "aspherical optics"). The surface is shaped in largely unrestricted fashion in order to achieve the desired goal in optically optimum fashion. Hyperboloids, ellipsoids, or other geometries, but also geometries assembled therefrom, may be suitable for this.

Be it noted that the features of the invention that are set forth above can be used not only in the combination presented, but also in other combinations or isolated, without leaving the context of the present invention.

The invention and its advantages will be explained below with reference to exemplifying embodiments that are depicted in further detail in the Figures.

DETAILED DESCRIPTION OF THE INVENTION

Figure 1:
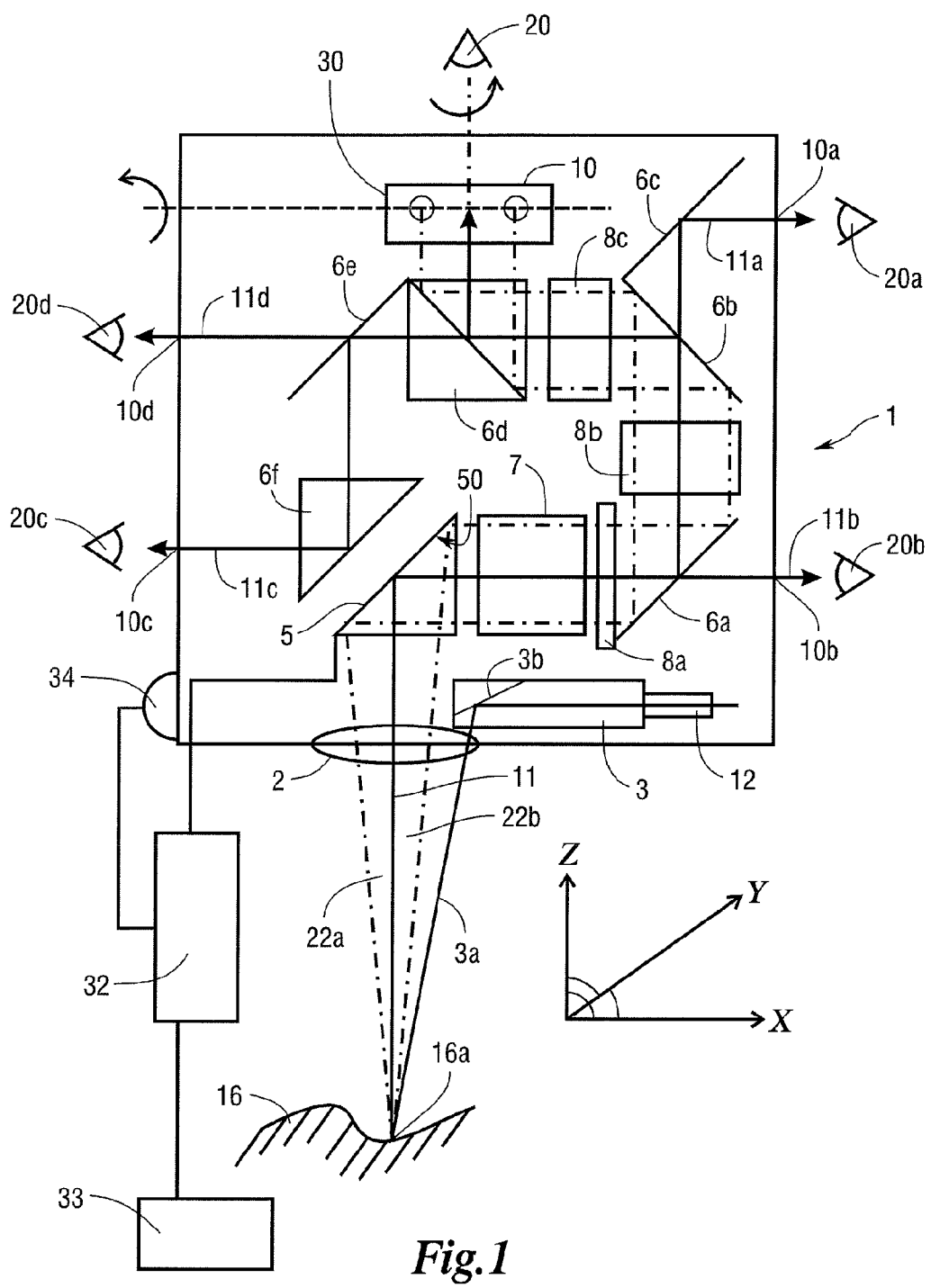
FIG. 1 shows a schematic construction of a stereomicroscope having multiple ports for principal and assistant observers, the stereomicroscope being vibration-damped according to the present invention.

FIG. 1 schematically shows the configuration of a stereomicroscope 1 having multiple ports 10, 10a, 10b, 10c, and 10d for multiple observers 20, 20a, 20b, 20c, and 20d. The observers can be principal and/or assistant observers. Stereomicroscope 1 is suitable in particular for use as a surgical microscope, in particular in opthalmology. Here, the surgeon usually functions as the principal observer, who is assisted by multiple assistants. Outcoupling of the observation beam path to a documentation device via a corresponding documentation port is, of course, also possible. Port 10 can be configured with a pivotable deflection element 30. Stereomicroscope 1 possesses a principal objective 2 with which a specimen 16 can be observed. Principal objective 2 defines an observation beam path that defines a beam base point 16a on specimen 16 in accordance with the focal length of principal objective 2.

In the embodiment of stereomicroscope 1 depicted in FIG. 1, zoom system 7 is embodied in a "lying" manner or horizontally in order to reduce the overall height of stereomicroscope 1. This type of construction of a stereomicroscope is already known from DE 102 55 960 A1 (corresponding to U.S. Pat. No. 7,206,127) as recited in the introductory part of the description. For further explanations regarding the construction and manner of operation of stereomicroscope 1, reference is made explicitly to the aforesaid document. Deflection element 5 reflects the observation beam path, coming from principal objective 2, into the observation channels of zoom system 7. It is advantageous to configure zoom system 7 as an afocal zoom system, so that parallel observation beam paths can enter zoom system 7 and likewise emerge from it in parallel fashion.

Zoom system 7 can have further deflection elements 6a to 6f arranged downstream it as required. They serve to direct a portion of the observation beam path to the corresponding port 10, 10a to 10d, for which purpose deflection elements 6a, 6b, 6d, and 6e are embodied in semitransparent fashion. Further optical components 8a, 8b, and 8c, whose function will be explained later on, can be provided in the observation beam path.

The stereoscopic channels for the principal observation beam paths are located one behind another in the depiction according to FIG. 1. Zoom system 7 of stereomicroscope 1 generally comprises two principal observation channels, and can additionally comprise two separate assistant's observation channels that are depicted by way of example in FIG. 1.

Numeral 3 designates an illumination unit that directs light for illumination along illumination direction 3a onto specimen 16 being examined. The light of illumination unit 3 can be made available via a light-guiding fiber (fiber-optic cable) 12 or a directly installed light source. The light is directed via a deflection element 3b through principal objective 2 onto specimen 16. In the case depicted, the observation beam path consequently proceeds through principal objective 2. Also conceivable, however, is an arrangement in which the main or principal objective 2 is bypassed by the illumination.

Two assistant's observation beam bundles 22a and 22b pass through principal objective 2 in a substantially vertical direction. The principal observations beam bundles are placed one behind another in the drawing, and are not depicted separately. After corresponding (right-angle) deflection by deflection element 5, observation beam bundles 22a and 22b will enter the observation channels of zoom system 7, which proceed substantially horizontally and one above another.

In the construction depicted in FIG. 1, the observation beam bundles are deflected by further deflection element 6a, after they emerge from zoom system 7, into the vertical direction, whereupon they encounter a further deflection element 6b by means of which another deflection into the horizontal direction occurs (second plane of microscope 1), whereupon another deflection at deflection element 6d into the vertical direction occurs. An embodiment of the corresponding deflection elements as beam splitters yields the observation axes labeled 11a, 11b, 11c, and 11d that are directed onto the respective ports 10a to 10d. Light is delivered to the observer (assistant) 20 via deflection element 6d. This deflection element is embodied in such a way that it deflects only beam bundles 22a, 22b, while the beam bundles for principal observer 20d pass through deflection element 6d without deflection. These bundles can encounter the optional further deflection elements 6e and 6f so that the principal observer can be positioned at 20c. The use of a deflection element 6d of this kind makes it easy to implement a physical separation of assistant's observation bundles 22a, 22b from the principal observation beam bundle with no loss of light intensity. The embodiments of an assistant's observation system that are described here are entirely optional.

The binocular tubes with eyepieces necessary for observation are not depicted in FIG. 1 for the sake of clarity. Optical components 8a to 8c are additional components that can be used optionally, such as filters, laser shutters, optical splitters, data overlay systems, diaphragms, displays, and the like. Assistant 20 observes specimen 16 via a rotatable deflection element 30 that is pivotable in desired fashion depending on the assistant's position.

The description of the configuration of stereomicroscope 1 depicted in FIG. 1 is given merely by way of example. The elements significant for the present invention are essentially principal objective 2 and deflection mirror 5 (representing deflection elements 5 and 6a to 6f).

At least one of deflection elements 5, 6a to 6f is embodied as a mirror having a controllably deformable mirror surface 50. In the embodiment according to FIG. 1, only deflection element 5 is correspondingly embodied. Deflection element 5 is connected to a control unit 32 for adjusting the mirror surface. In a preferred embodiment, deformable mirror surface 50 is embodied as a micromirror array 40, as depicted schematically in FIG. 2.

Control unit 32 can further be connected to a switching element 33 that can be implemented, for example, as a foot switch, a manual switch console, a remote-control system, a voice-control system, or an eye tracking system. By way of this switching element 33, control can be applied to control unit 32, which in turn adjusts in desired fashion the micromirror array 40 or, more generally, deformable mirror surface 50. By suitable adjustment of micromirror array 40, the position of beam base point 16a of the observation beam path in the X-Y plane on specimen 16 can be modified. In this fashion, different regions in the X-Y plane of specimen 16 can be observed without thereby modifying the position of microscope 1 as a whole. The Applicant will seek protection for this hitherto unknown aspect with a separate Application.

According to the present invention, a vibration sensor 34 is mounted on microscope 1, which sensor measures the vibrations of microscope 1 and generates a corresponding output signal. The output signal can advantageously distinguish vibrations in each of the three spatial directions X, Y, and Z as depicted in FIG. 1. For this, for example, three separate output signals can be provided. The output signals of vibration sensor 34 are delivered to control unit 32. With a vibration-related displacement of microscope 1 in the X direction, beam base point 16a on specimen 16 would correspondingly migrate. This would be apparent as a troublesome wobble in the image. A displacement in the X direction can now be compensated for by the fact that the micromirrors (cf. FIG. 2) are each tilted about a tilt axis that is perpendicular to the drawing plane of FIG. 1. To compensate for a vibration-related displacement in the Y direction, a tilt is correspondingly necessary about respective tilt axes that lie in the drawing plane of FIG. 1 and extend through the respective micromirrors. Because control is applied to the relatively small micromirrors electronically via control unit 32, the micromirrors can be controlled and adjusted with virtually no inertia. This simplifies the control system for vibration compensation, and enables vibration compensation in real time with no time delay.

Because vibration compensation is therefore generated, in the embodiment according to FIG. 1, by correspondingly opposite-phase deflection of the microscope image, or, more accurately, of the intermediate microscope image generated by principal objective 2, it is clear to one skilled in the art that such vibration compensation can also be accomplished by correspondingly configured deflection elements 6a, 6b, 6c, 6d, 6e, and/or 6f. In the arrangement depicted in FIG. 1, however, vibration compensation by means of deflection element 5 is most useful, since this deflection element serves all downstream ports.

Vibration compensation in the X and Y direction has been discussed with reference to a micromirror array. The very same control mechanism is transferable to other deformable mirror surfaces 50.

The construction and manner of operation of a micromirror array known per se from the existing art will be discussed briefly with reference to FIGS. 2 and 3.

Figure 2:
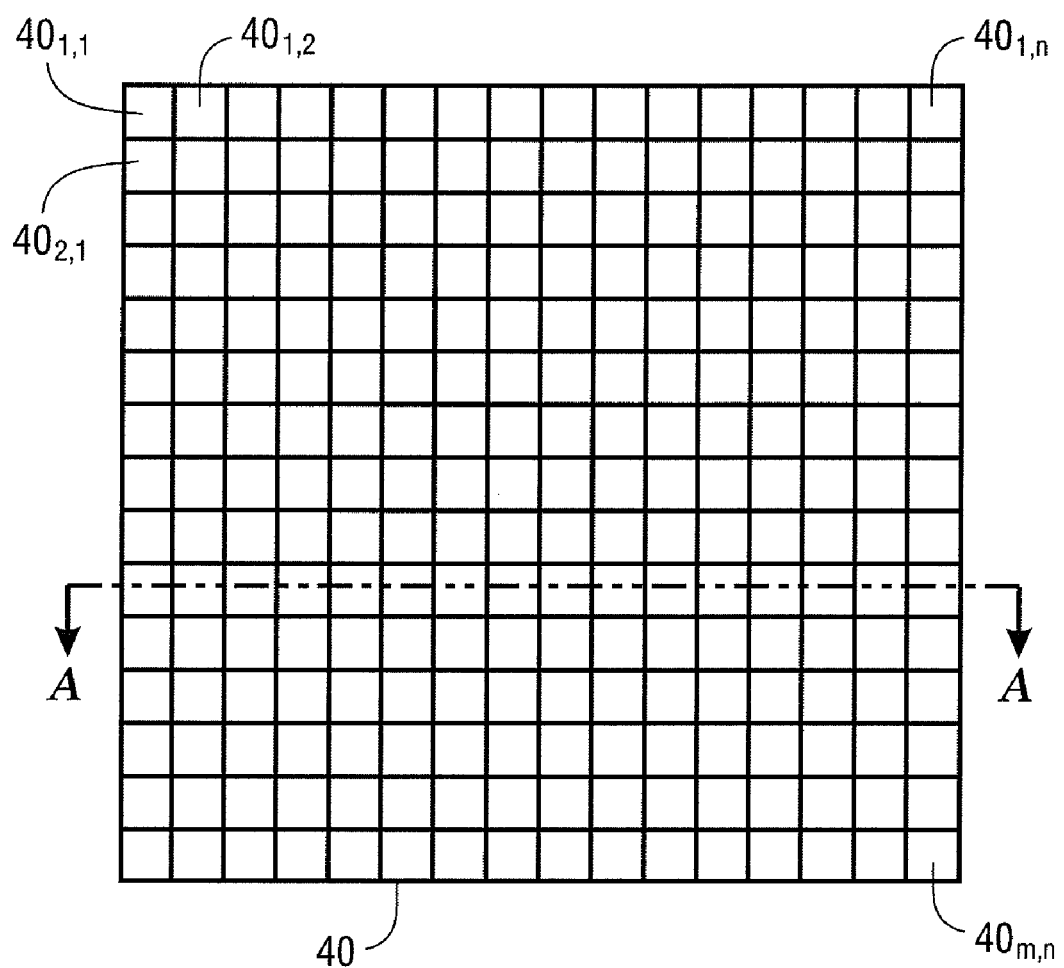
FIG. 2 is a schematic plan view of a micromirror array.

FIG. 2 is a schematic view of a micromirror array 40 that is constructed from a multiplicity of small mirrors $40_{1,1}$, $40_{1,2}$, ... $40_{1,n}$, m such lines being present, so that a two-dimensional matrix of mirrors $40_{1,1}$ to $40_{m,n}$ results. Control is applied to the individual micromirrors via control unit 32 in such a way that the angular position of the mirrors changes. Each mirror can be adjustable as to its angle about two tilt axes. The tilt axes are generally perpendicular to one another. The mirrors of micromirror array 40 can be adjusted individually or in groups. The base frame (not depicted in FIG. 2) supporting micromirror array 40 remains unchanged in its position. The reflection direction of each mirror can thus be set by means of electronic control application and tilting of each individual micromirror. If all the micromirrors of micromirror array 40 were physically adjusted in the same fashion, the result macroscopically is a deflection of the beam path as in the case of a conventional mirror.

Details regarding control application for a micromirror array 40 are known from the existing art and will therefore not be explained here in detail.

Figure 3:
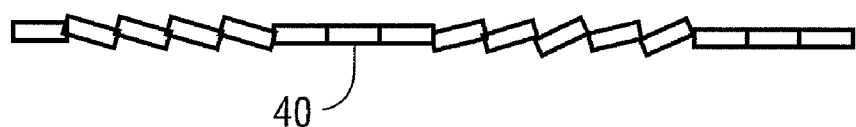
FIG. 3 is a sectioned view of the micromirror array along line A-A of FIG. 2.

FIG. 3 is a sectional view of micromirror array 40 along line A-A indicated in FIG. 2, individual mirrors being adjusted. The orientation shown in FIG. 3 of the micromirrors causes the aforementioned "aspherical orientation" of the micromirrors that can be used, as explained below, to compensate for vibrations in the Z direction. "Spherical or aspherical adjustment" of the micromirrors means a spherical or aspherical orientation that, however, is projected onto the base plane (plane defined by the baseplate) of micromirror array 40, since the micromirrors themselves are not movable perpendicular to said plane. Also conceivable, on the other hand, are deformable mirror surfaces that, for example, permit a spherical surface conformation.

As already mentioned, tilting of all the micromirrors of micromirror array 40 in the same fashion can cause a correction of vibration-related displacements in the X-Y plane in real time. The invention also, however, allows compensation for vibrations in the Z direction that would result in unsharpness in the image. This will be explained with reference to FIG. 4.

Figure 4:
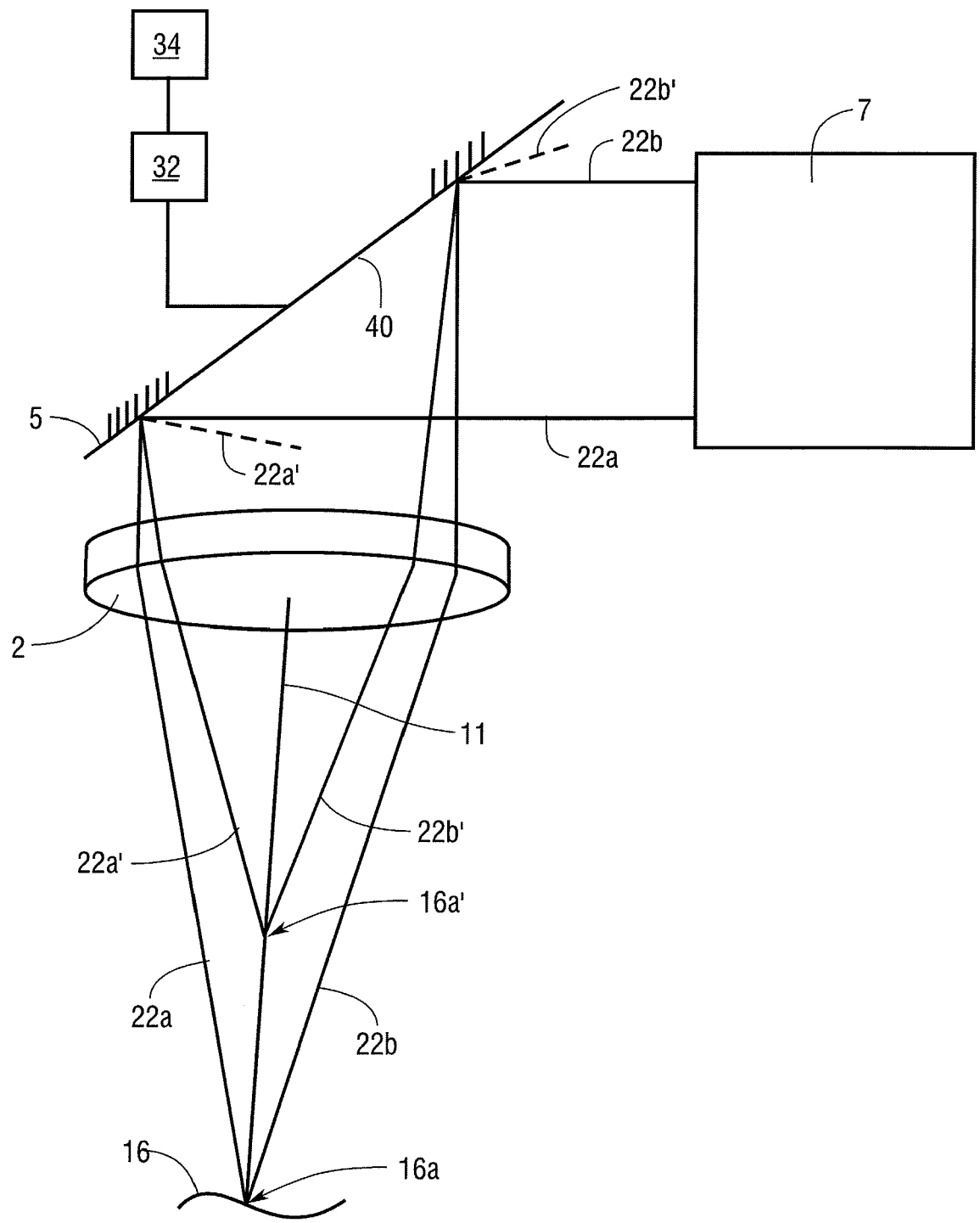
FIG. 4 is a schematic view of a detail of FIG. 1, the detail view depicting the beam path between the specimen and the zoom system, the change in the effective focal length of the principal objective being schematically sketched.

FIG. 4 shows very schematically, in a manner not true to scale, a situation such as the one that occurs with a vibration in the Z direction. Such a vibration results, for example, in a displacement of microscope 1 in the Z direction, i.e. toward specimen 16. With a principal objective 2 having a fixed focal length, this would cause beam base point 16a (cf. FIG. 1) to migrate, so to speak, into specimen 16, so that the result is an unsharp image that in some circumstances remains unnoticed in certain regions because of the available depth of field of microscope 1, but that results in general in a reduced depth of field. To correct such a displacement optimally, however, according to the present invention the effective focal length of principal objective 2 is shortened so that beam base point 16a' always remains on the specimen 16. FIG. 4 illustrates the procedure for shortening the effective focal length of principal objective 2; for reasons of clarity, the simultaneous motion of microscope 1 in the Z direction toward specimen 16 is not depicted.

FIG. 4 shows the beam profile for a beam base point 16a, with appurtenant observation beam bundles 22a and 22b that are imaged by means of principal objective 2 at infinity and then deflected by deflection element 5 into zoom system 7 substantially perpendicular to optical axis 11. Other specimen points located on axis 11, which lie outside the focal plane of principal objective 2 extending through specimen 16, are not imaged at infinity by principal objective 2, so that after deflection by deflection element 5, the observation beam bundles (cf. bundles 22a' and 22b') cannot enter the stereoscopic channels of zoom system 7 (cf. dashed lines 22a' and 22b'). In the depiction of FIG. 4, point 16a' is therefore not imaged. Deflection element 5 depicted in FIG. 4 can once again be a micromirror array 40 that acts, in the situation described, like a planar deflection mirror, i.e. the individual micromirrors are not tilted, but instead all lie in planar fashion in the principal plane of micromirror array 40. If a deformable mirror surface 50 were used, the latter would be not deformed but planar.

When microscope 1 then moves, as a result of vibration, toward the plane of specimen 16, the focal length of principal objective 2 must then be tracked so that a sharp image can continue to be observed through microscope 1. As depicted in FIG. 4, the optical refractive power of system 2 and 5 can be modified in such a way that beams 22a' and 22b' travel into zoom system 7. This corresponds to a modification of the effective refractive power of principal objective 2. In the subregions of deflection element 5 (embodied as micromirror array 40) that are drawn with hatching in FIG. 4, a modified reflection angle of beams 22a' and 22b' can be achieved by corresponding spatial orientation of the relevant micromirrors, so that said beams are directed into zoom system 7. In total, this requires, for example, a correspondingly spherical spatial orientation (in the manner of a concave mirror) of the relevant micromirrors in the subregions depicted with hatching. When the relevant micromirrors acquire the orientation necessary for this purpose, the specimen point located at beam base point 16a' is sharply imaged by the system. Imaging of the specimen point located at beam base point 16a would then no longer be possible (if the existing depth of field is disregarded).

Consequently, when vibration sensor 34 detects a vibration-related displacement of microscope 1 toward specimen 16, control unit 32 applies control to micromirror array 40 of deflection element 5 in such a way that (at least) in the hatched subregions of FIG. 4, a spherical (or even aspherical, but not planar) orientation of the micromirrors of micromirror array 40 is established, so that in chronological succession, in opposite phase to the vibrational displacement, the effective focal length of the principal objective is modified in such a way that the beam base point is changed from position 16a to position 16a' (provided this represents the vibration-related displacement travel).

Vibration-caused displacement in the Z direction are on the order of $\frac{1}{10}$ mm. According to the present invention a Z compensation can also be performed, in addition to the X-Y compensation already described, by correspondingly modifying the effective focal length of main objective 2. This has the advantage that the microscope image remains sharp, while a corresponding change in magnification caused by the focal length change is almost or entirely unnoticed by the viewer because of its small magnitude.

PARTS LIST

- 1 Microscope
- 2 Principal objective
- 3 Illumination unit
- 3a Illumination direction
- 3b Deflection element
- 5 Deflection element
- 6a-6f Deflection element
- 7 Zoom system
- 8a-8c Optical component
- 10, 10a-10d Port for observer
- 11 Optical axis
- 11a-11d Observation axis
- 12 Light-guiding fiber
- 16 Specimen
- 16a, 16a' Beam base point
- 20, 20a-20d Observer
- 22a, 22b Observation beam bundle
- 22a', 22b' Observation beam bundle
- 30 Deflection element
- 32 Control unit
- 33 Switching element
- 34 Vibration sensor
- 40 Micromirror array
- 40$_{i,j}$ Micromirror (i=1, ..., n; j=1, ..., m)
- 50 Mirror surface

What is claimed is:

1. An optical device comprising:
   a beam path;
   a deflection element arranged in the beam path for deflecting the beam path, the deflection element including a mirror having a controllably deformable mirror surface;
   a vibration sensor arranged in or on the optical device, the vibration sensor generating at least one output signal corresponding to vibrations of the optical device; and
   a control unit connected to the vibration sensor and the deflection element, the control unit receiving the output signal and applying control to the deflection element as a function of the at least one output signal from the vibration sensor, wherein the control unit adjusts the mirror surface such that vibrations of the optical device are compensated for by a correspondingly opposite-phase adjustment of the mirror surface;
   wherein the deformable mirror surface of the deflection element is embodied as a micromirror array having a plurality of individually controllable micromirrors, wherein the spatial orientation of each of the plurality of micromirrors is adjustable;
   wherein the optical device is a microscope comprising a principal objective that defines an observation beam path along an optical axis, wherein the observation beam path is the beam path of the optical device, and the deflection element deflects the observation beam path proceeding from the principal objective;
   wherein the control unit adjusts the mirror surface such that vibrations of the microscope are compensated for by a correspondingly opposite-phase adjustment of the mirror surface in such a way that vibrations of the microscope are compensated for by a correspondingly opposite-phase deflection of a microscope image
   wherein the control unit adjusts the mirror surface such that vibrations of the microscope in a plane perpendicular to the optical axis of the principal objective are compensated for by tilting individual micromirrors in the micromirror array about at least one of two mutually perpendicular tilt axes;
   wherein the control unit adjusts the mirror surface such that vibrations of the microscope in the direction of the optical axis of the principal objective are compensated for by a spherical or aspherical, non-planar orientation of the micromirrors of the micromirror array.

2. The optical device according to claim 1, wherein the at least one output signal includes three separate output signals respectively corresponding to vibrations along each of three orthogonal spatial directions X, Y, and Z.

* * * * *